US010844943B2

(12) United States Patent
Ohmura et al.

(10) Patent No.: US 10,844,943 B2
(45) Date of Patent: Nov. 24, 2020

(54) ROTATING BODY, POWER TRANSMISSION DEVICE USING SAME, AND ROTATING BODY PRODUCTION METHOD

(71) Applicant: HONDA MOTOR CO., LTD., Tokyo (JP)

(72) Inventors: Jun Ohmura, Saitama (JP); Koji Ono, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 361 days.

(21) Appl. No.: 15/767,195

(22) PCT Filed: Oct. 21, 2016

(86) PCT No.: PCT/JP2016/081297
§ 371 (c)(1),
(2) Date: Apr. 10, 2018

(87) PCT Pub. No.: WO2017/069248
PCT Pub. Date: Apr. 27, 2017

(65) Prior Publication Data
US 2019/0072166 A1    Mar. 7, 2019

(30) Foreign Application Priority Data

Oct. 23, 2015 (JP) .................. 2015-209408
Jan. 20, 2016 (JP) .................. 2016-009083

(51) Int. Cl.
*F16H 48/08* (2006.01)
*F16D 1/116* (2006.01)
(Continued)

(52) U.S. Cl.
CPC .............. *F16H 48/08* (2013.01); *F16C 3/02* (2013.01); *F16D 1/06* (2013.01); *F16D 1/116* (2013.01);
(Continued)

(58) Field of Classification Search
CPC .......... F16H 48/08; F16H 48/42; F16H 48/22; F16H 2048/085; F16D 1/116; F16D 1/06;
(Continued)

(56) References Cited

U.S. PATENT DOCUMENTS 4,123,951 A * 11/1978 Kagata .................... F16H 48/22
4,939,953 A *  7/1990 Yasui ...................... F16H 48/22

FOREIGN PATENT DOCUMENTS

CN       1246175 A       3/2000
JP       5-27401 U       4/1993
JP       2012-167793 A   9/2012

OTHER PUBLICATIONS

International Search Report dated Jan. 24, 2017, issued in counterpart International Application No. PCT/JP2016/081297 (1 page).
(Continued)

*Primary Examiner* — Greg Binda
(74) *Attorney, Agent, or Firm* — Westerman, Hattori, Daniels & Adrian, LLP

(57) ABSTRACT

A drive shaft (7) as a rotating body includes an engaging portion (7c) engaging with a side gear (14) and a sliding portion (7b) abutted by a differential case (9). The engaging portion (7c) includes a plurality of engaging grooves (15). The engaging grooves (15) engage with the side gear (14). The engaging portion (7c) includes a small diameter portion (15d) at a position corresponding to between the drive shaft (7) and the differential case (9) in a direction of a rotational axis L1. The small diameter portion (15d) has an outer diameter smaller than the outer diameter of the sliding portion (7b).

8 Claims, 6 Drawing Sheets

(51) Int. Cl.
　　*F16C 3/02*　　　(2006.01)
　　*F16D 1/06*　　　(2006.01)
　　*F16H 48/42*　　 (2012.01)
　　*F16D 1/10*　　　(2006.01)
　　*F16C 17/02*　　 (2006.01)
　　*F16H 48/22*　　 (2006.01)

(52) U.S. Cl.
　　CPC .............. *F16H 48/42* (2013.01); *F16C 17/02* (2013.01); *F16D 2001/103* (2013.01); *F16H 48/22* (2013.01); *F16H 2048/085* (2013.01); *Y10T 403/7035* (2015.01)

(58) Field of Classification Search
　　CPC ...... F16D 2001/103; F16C 3/02; F16C 17/02; Y10T 403/7035
　　USPC ........................................ 403/359.6; 475/239
　　See application file for complete search history.

(56) References Cited

OTHER PUBLICATIONS

Office Action dated May 25, 2020, issued in counterpart CN Application No. 201680058752.0, with English Translation. (23 pages).

\* cited by examiner

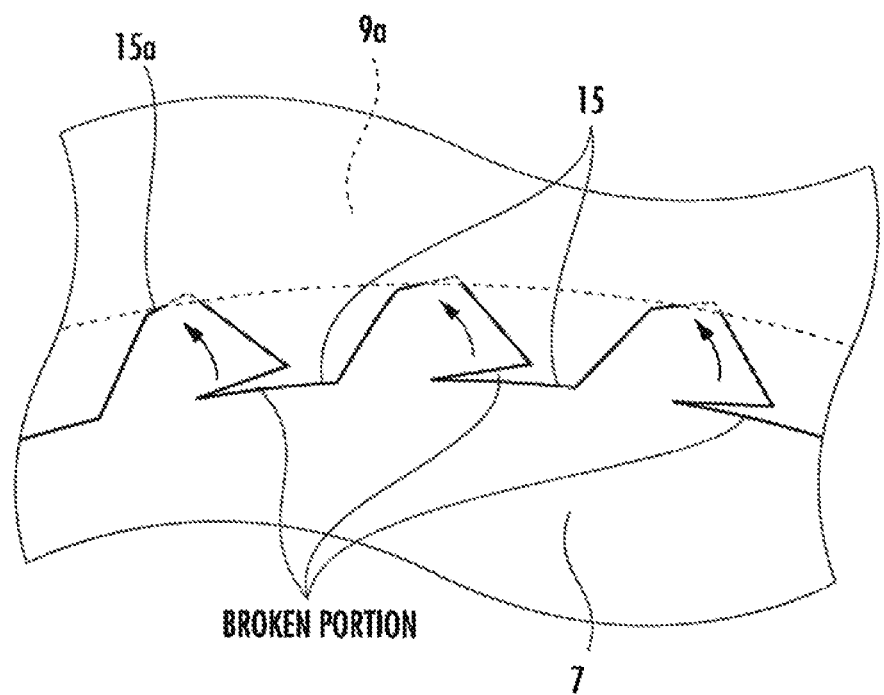

ROTATING BODY, POWER TRANSMISSION DEVICE USING SAME, AND ROTATING BODY PRODUCTION METHOD

TECHNICAL FIELD

The present invention relates to a rotating body disposed on a power transmission path through which power from a prime mover is transmitted, or a power transmission device using this rotating body, a vehicle using the same, and a rotating body production method.

BACKGROUND ART

There has conventionally been known a differential device (diff) which distributes power to left and right drive shafts as a power transmission device (for example, see Japanese Patent Laid-Open No. 2012-167793). This differential device has a configuration in which a fragile portion of a drive shaft is formed in a differential case of the differential device so that if a drive shaft is broken, the drive shaft is allowed to be broken within the differential case.

CITATION LIST

Patent Literature

Patent Literature 1: Japanese Patent Laid-Open No. 2012-167793

SUMMARY OF INVENTION

Technical Problem

The present invention has an object to provide a rotating body capable of improving the degree of freedom in setting the location of breakage when the rotating body such as a drive shaft is broken.

Solution to Problem

[1] In order to solve the above object, the present invention provides a rotating body (for example, a drive shaft 7 in an embodiment, the same shall apply hereinafter) disposed on a power transmission path between a prime mover (for example, an internal combustion engine 5 in the embodiment, the same shall apply hereinafter) and a wheel (for example, a rear wheel 4 in the embodiment, the same shall apply hereinafter). The rotating body comprises: an engaging portion (for example, an engaging portion 7c in an embodiment, the same shall apply hereinafter) located on one side of the rotating body in a direction of a rotational axis (for example, a rotational axis L1 in the embodiment, the same shall apply hereinafter) and having an engaging groove (for example, an engaging groove 15 in the embodiment, the same shall apply hereinafter) engraved on an outer periphery thereof; and a sliding portion (for example, a sliding portion 7b in the embodiment, the same shall apply hereinafter) located on the other side of the rotating body in the rotation axial direction and slidably abutted by an abutment member (for example, a differential case 9 in the embodiment, the same shall apply hereinafter) which can rotate relative to the rotating body, wherein the rotating body is arranged such that the sliding portion is located closer to a wheel side on the power transmission path than the engaging portion, the engaging groove comprises a plurality of engaging grooves extending in the rotation axial direction and formed circumferentially at intervals, the engaging portion includes a small diameter portion (for example, a small diameter portion 15d in the embodiment, the same shall apply hereinafter) located closer to the one side in the rotation axial direction than the other side (for example, other end 15e in the embodiment, the same shall apply hereinafter) which is an end portion on the other side of the engaging groove, and the small diameter portion has an outer diameter smaller than an outer diameter of the sliding portion.

According to the rotating body of the present invention, when a force large enough to break the rotating body is applied, the rotating body is broken at a small diameter portion disposed in the engaging portion having engaging grooves formed thereon. Therefore, the present invention can improve the degree of freedom in setting the broken portion as compared with the conventional product in which a fragile portion is provided avoiding the engaging portion.

[2] In addition, in the rotating body of the present invention, it is preferable that the small diameter portion is formed such that a deepest portion thereof is located radially outwardly of a bottom position of the engaging grooves. Such a configuration can prevent the rotating body from being broken starting from a portion where a difference in outer diameter between the small diameter portion and the sliding portion is generated by forming the small diameter portion.

[3] In addition, a power transmission device of the present invention comprises another rotating body (for example, a side gear 14 in the embodiment, the same shall apply hereinafter) engaged with the engaging grooves and integrally rotatable with the rotating body.

The present invention allows another rotating body to be engaged with the engaging grooves, causing the portion of the engaging grooves engaged with the other rotating body to be unlikely broken. Since the point of application of a twisting load of the other rotating body is an end portion of the other rotating body, the broken portion can be set by the engagement between the engaging grooves and the other rotating body.

Since the outer diameter of the small diameter portion of the engaging portion is set smaller than the outer diameter of the sliding portion, the small diameter portion of the engaging portion functions as the fragile portion. Thus, when the twisting load large enough to break the rotating body is applied to the rotating body, the break occurs at the small diameter portion of the engaging portion.

At this time, as the small diameter portion is twisted and broken, a mountain portion between the circumferentially adjacent engaging grooves is torn off from the base and rolled up, causing the broken portion to expand in diameter radially outwardly. The expansion in diameter of the mountain portion at the time of the breakage causes the enlarged diameter portion to be caught on a portion on one side of the abutment member. The catching on the abutment member can prevent the rotating body from excessively moving in the rotation axial direction.

In addition, according to the present invention, the abutment member locks the enlarged diameter portion in breakage region using the radially outward expansion in diameter due to the breakage of the small diameter portion of the rotating body without separately providing a movement prevention device for preventing the rotating body from moving in the rotation axial direction, thus achieving reduction in size of the power transmission device.

[4] In addition, it is preferable that assuming that the rotating body is defined as a first rotating body and the other rotating body is defined as a second rotating body, the power transmission device of the present invention comprises a regulating member (for example, a set ring 16 in the embodiment, the same shall apply hereinafter) which is disposed between the first rotating body and the second rotating body and regulates relative movement between the first rotating body and the second rotating body in the rotation axial direction, wherein in a state where the first rotating body and the second rotating body are regulated by the regulating member, an end portion (for example, a stepped portion 15*c* in the embodiment, the same shall apply hereinafter) on the other side of the small diameter portion of the first rotating body is located closer to the other side than an end portion (for example, an outer end portion 14*c* in the embodiment, the same shall apply hereinafter) on the other side of the second rotating body.

Such a configuration can prevent the second rotating body from suppressing the radial expansion of the broken portion when the first rotating body is broken at the small diameter portion. Thus, the broken portion of the first rotating body is allowed to greatly expand radially outwardly, and thus the broken portion can be firmly locked to the abutment member.

[5] In addition, it is preferable that the power transmission device of the present invention comprises an interposed member (for example, a washer 17 in the embodiment, the same shall apply hereinafter) disposed between the second rotating body and the abutment member in the rotation axial direction to secure a distance between the second rotating body and the abutment member in the rotation axial direction, wherein the interposed member includes an insertion hole (for example, an insertion hole 17*a* in the embodiment, the same shall apply hereinafter) for inserting the first rotating body.

Such a configuration can prevent the interposed member from narrowing the distance between the second rotating body and the abutment member in the rotation axial direction and can maintain the distance between the second rotating body and the abutment member in the rotation axial direction so that the broken portion has a distance enough to expand radially outwardly when the first rotating body is broken.

[6] In addition, it is preferable that in the present invention, the insertion hole of the interposed member is formed to have an inner diameter larger by a predetermined amount than an outer diameter of the first rotating body. Such a configuration allows the broken portion of the first rotating body to expand radially further easily.

[7] In addition, it is preferable that in the present invention, the inner diameter of the insertion hole is formed larger than a maximum outer diameter of an enlarged diameter portion whose diameter is enlarged due to breakage of the first rotating body after the first rotating body is broken as a predetermined or more twisting torque is inputted to the first rotating body.

The radial expansion at the time of breakage of the first rotating body can be experimentally obtained in advance. Thus, forming the inner diameter of the insertion hole of the interposed member larger than the experimentally obtained maximum outer diameter of the enlarged diameter portion of the first rotating body can prevent the radial expansion from being suppressed by the interposed member when the first rotating body is broken, and thus the broken portion can be firmly locked to the abutment member by a portion expanded radially outwardly by the breakage of the small diameter portion of the first rotating body.

[8] In addition, it is preferable that in the present invention, the interposed member is radially unmovably fixed to the second rotating body or the abutment member. Such a configuration can circumferentially uniformly secure enough space for the broken portion to expand in diameter at the time of breakage of the small diameter portion of the first rotating body.

[9] In addition, it is preferable that in the present invention, the engaging grooves are formed up to one end (for example, one end 7*f* in the embodiment, the same shall apply hereinafter) which is an end portion on one side of the first rotating body. Such a configuration allows the engaging grooves to be formed from the one end of the first rotating body toward the abutment member. Thus, it is easier to process the engaging grooves than, for example, a configuration of forming the engaging grooves only in an intermediate portion of the first rotating body.

[10] In addition, the present invention provides a rotating body production method, the rotating body being disposed on a power transmission path between a prime mover and a wheel of a vehicle, the rotating body includes an engaging portion located on one side of the rotating body in a rotation axial direction thereof and having an engaging groove engraved on an outer periphery thereof; a sliding portion located on the other side of the rotating body in the rotation axial direction and slidably abutted by an abutment member which can rotate relative to the rotating body; and a small diameter portion located on the one side of the rotating body in the rotation axial direction and having an outer diameter set smaller than an outer diameter of the sliding portion, wherein the rotating body is arranged such that the sliding portion is located closer to a wheel side on the power transmission path than the engaging portion, the engaging groove comprises a plurality of engaging grooves extending in the rotation axial direction and formed circumferentially at intervals, the method comprising:

a first step of forming an outer periphery of the rotating body;

a second step of forming the small diameter portion from the one side of the outer periphery of the rotating body to the other side; and a third step of forming the engaging portion by cutting the engaging grooves extending in the rotation axial direction from the one side of the rotating body to the other side than an end portion on the other side of the small diameter portion.

The method of the present invention can accurately form the shape of the small diameter portion by forming the engaging grooves after forming the small diameter portion.

[11] In addition, it is preferable that in the method of the present invention, a deepest portion of the engaging groove in the third step is formed radially inwardly of a deepest portion of the small diameter portion in the second step. The method of the present invention allows a mountain portion (for example, a mountain portion 15*a* in the embodiment) between the circumferentially adjacent engaging grooves to be broken and expand radially when the first rotating body is broken.

[12] In addition, it is preferable that the method of the present invention comprises a fourth step of polishing the sliding portion. The method of the present invention can reduce friction of the sliding portion and smoothly rotate the first rotating body with respect to the abutment member. In addition, the method of the present invention can remove burrs and the like generated when the engaging grooves are cut in the third step.

[13] In addition, it is preferable that in the method of the present invention, the second step is followed by a hollowing step of hollowing the interior of the rotating body, which is followed by the third step.

The method of the present invention performs the hollowing step of performing a hollowing process before the third step of forming the engaging grooves, and thus can perform the hollowing process before forming the engaging grooves to reduce rigidity and can improve the degree of processing freedom of the hollowing process. In addition, performing the hollowing process can reduce the weight of the rotating body. Further, since the hollowing process is performed before the engaging grooves are formed, the rotating body can be easily grasped with a jig or the like, thus facilitating the hollowing process.

[14] In addition, it is preferable that in the method of the present invention, the second step is followed by a heat treatment step of heating the rotating body, which is followed by the third step. According to the method of the present invention, the heat treatment step can improve the rigidity of the rotating body. Further, since the heat treatment is performed before the engaging grooves are formed, the first rotating body can be easily grasped with a jig or the like, thus facilitating the heat treatment.

[15] In addition, the rotating body or the power transmission device of the present invention can be used in a vehicle including a prime mover and a wheel.

BRIEF DESCRIPTION OF DRAWINGS

FIG. 6 is an explanatory drawing illustrating a state where a stepped portion expands in diameter when the first rotating body of the present embodiment is broken, as viewed from the rotation axial direction.

DESCRIPTION OF EMBODIMENTS

Figure 1:
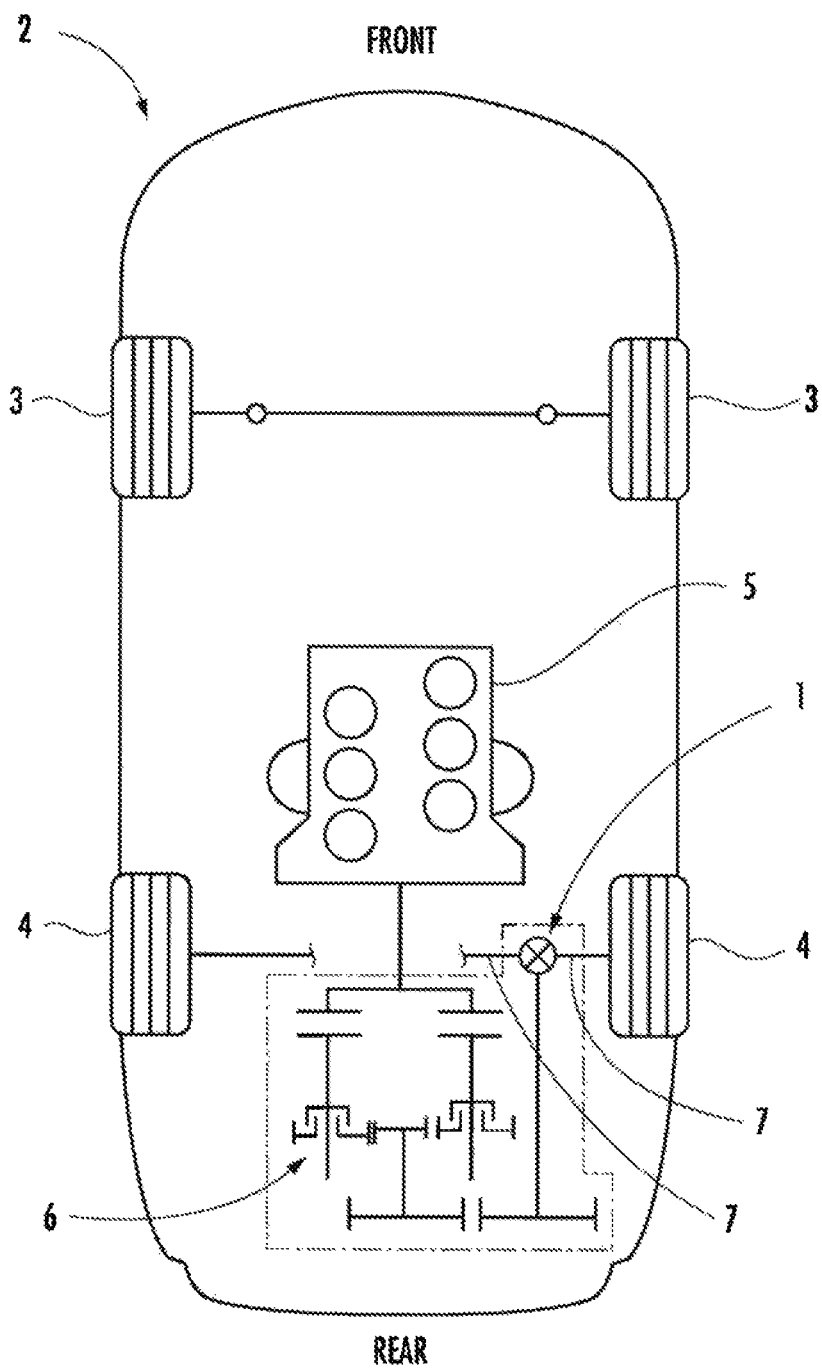
FIG. 1 is a schematic view illustrating a vehicle including an embodiment of a power transmission device of the present invention.

As illustrated in FIG. 1, a power transmission device 1 according to an embodiment of the present invention is disposed in a rear portion of a midship type vehicle 2. The vehicle 2 includes a pair of front wheels 3 and 3, a pair of rear wheels 4 and 4, an internal combustion engine 5, a transmission 6, and a pair of left and right drive shafts 7 and 7 connected to the pair of left and right rear wheels 4 and 4 respectively.

The power transmission device 1 has a function as a differential mechanism (diff) which distributes driving force output from the internal combustion engine 5 through the transmission 6 to the pair of left and right drive shafts 7 and 7.

Figure 2:
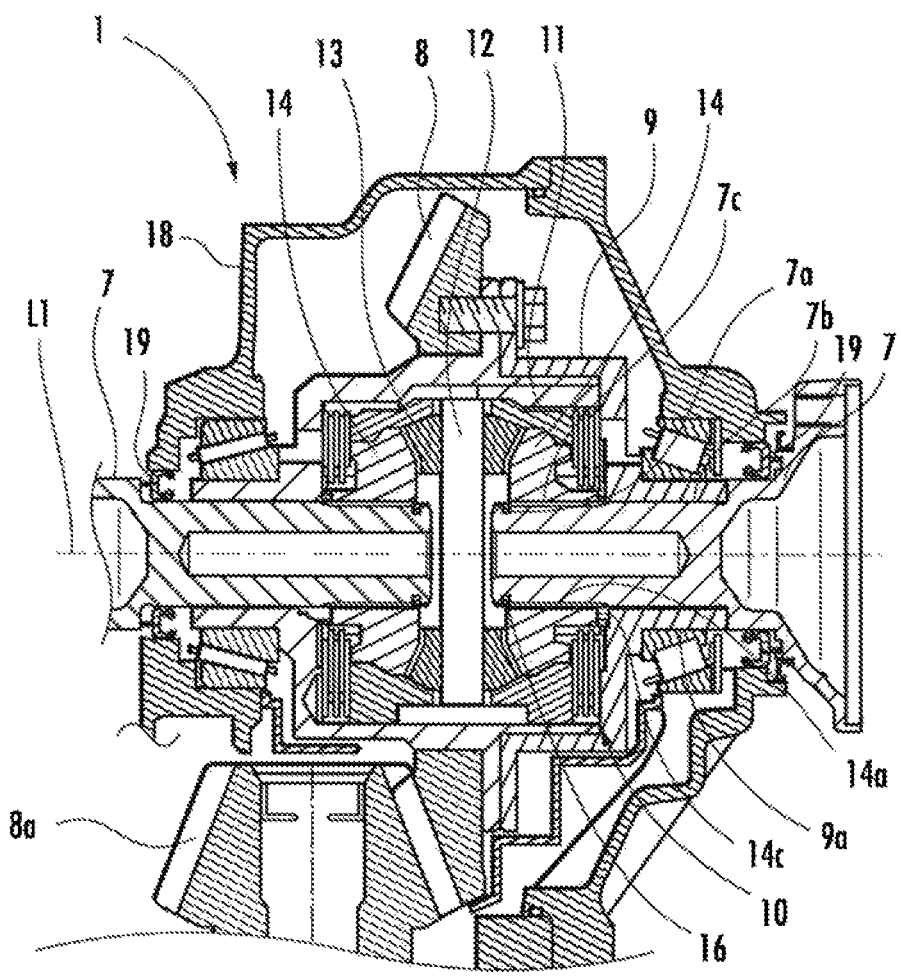
FIG. 2 is a sectional view illustrating the power transmission device of the present embodiment.

As illustrated in FIG. 2, the power transmission device 1 of the present embodiment includes a ring gear 8, a differential case 9, a pair of left and right multi-plate clutches 10, a pair of left and right pressure rings 11, a spring (unillustrated) which allows the pair of pressure rings 11 to be separated from each other so that an initial torque can be transmitted to the multi-plate clutches 10, a pinion shaft 12, a pinion 13, and a pair of left and right side gears 14. The ring gear 8 is a hypoid ring gear of a hypoid gear meshed with a hypoid pinion 8a as an output member of the transmission 6, and functions as a final driven gear.

The side gears 14 and 14 include a through-hole 14a. Each of the drive shafts 7 is inserted into the through-hole 14a, causing the drive shafts 7 and the side gears 14 to be spline-connected to each other.

The differential case 9 includes a cylindrical portion 9a which slidably abuts and holds the pair of drive shafts 7 and 7. In the drive shaft 7, a portion held by the cylindrical portion 9a corresponds to the sliding portion 7b of the present embodiment (see the area indicated by arrows 7b in FIGS. 4 and 5).

The driving force outputted from the internal combustion engine 5 is speed-changed by the transmission 6 and then transmitted to the power transmission device 1 through the hypoid pinion 8a and the ring gear 8. The driving force inputted to the power transmission device 1 is distributed to the pair of left and right side gears 14 and 14 through the differential case 9, the multi-plate clutch 10, the pressure ring 11, the pinion shaft 12, and the pinion 13. The driving force transmitted to the side gear 14 is transmitted to the rear wheel 4 through the drive shaft 7.

In short, the power transmission path according to the present embodiment includes the transmission 6, the hypoid pinion 8a, the ring gear 8, the differential case 9 of the power transmission device 1, the multi-plate clutch 10, the pressure ring 11, the pinion shaft 12, the pinion 13, the side gear 14, and the drive shaft 7.

Figure 3:
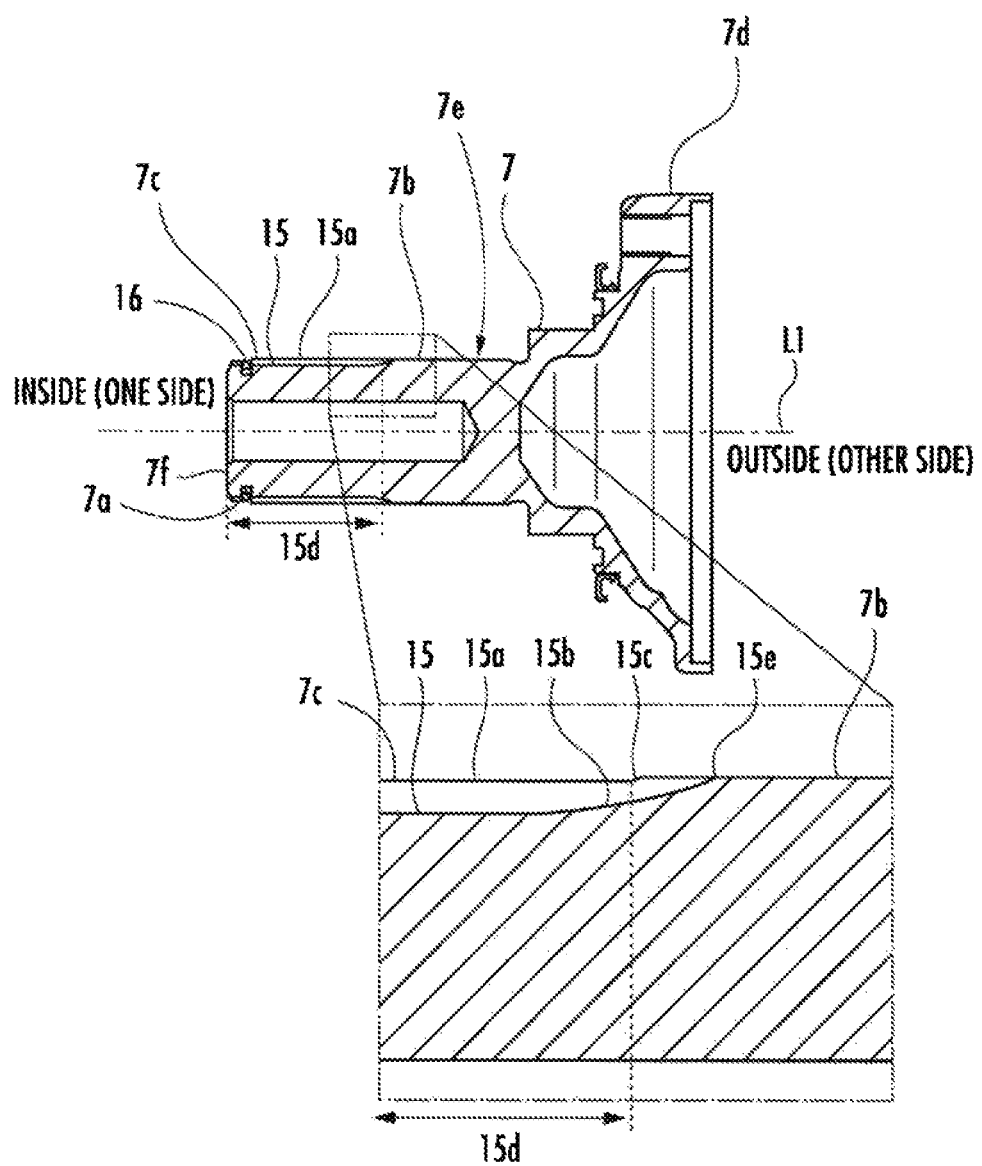
FIG. 3 is a sectional view illustrating a first rotating body of the present embodiment.

FIG. 3 illustrates a sectional view of the drive shaft 7. The engaging groove 15 for spline connection with the side gear 14 is engraved in an end portion inside (on the side gear side of) the drive shaft 7. The engaging groove 15 comprises a plurality of engaging grooves 15 which are formed circumferentially at intervals by cutting processing, and the mountain portion 15a is formed circumferentially between the adjacent engaging grooves 15.

Figure 4:
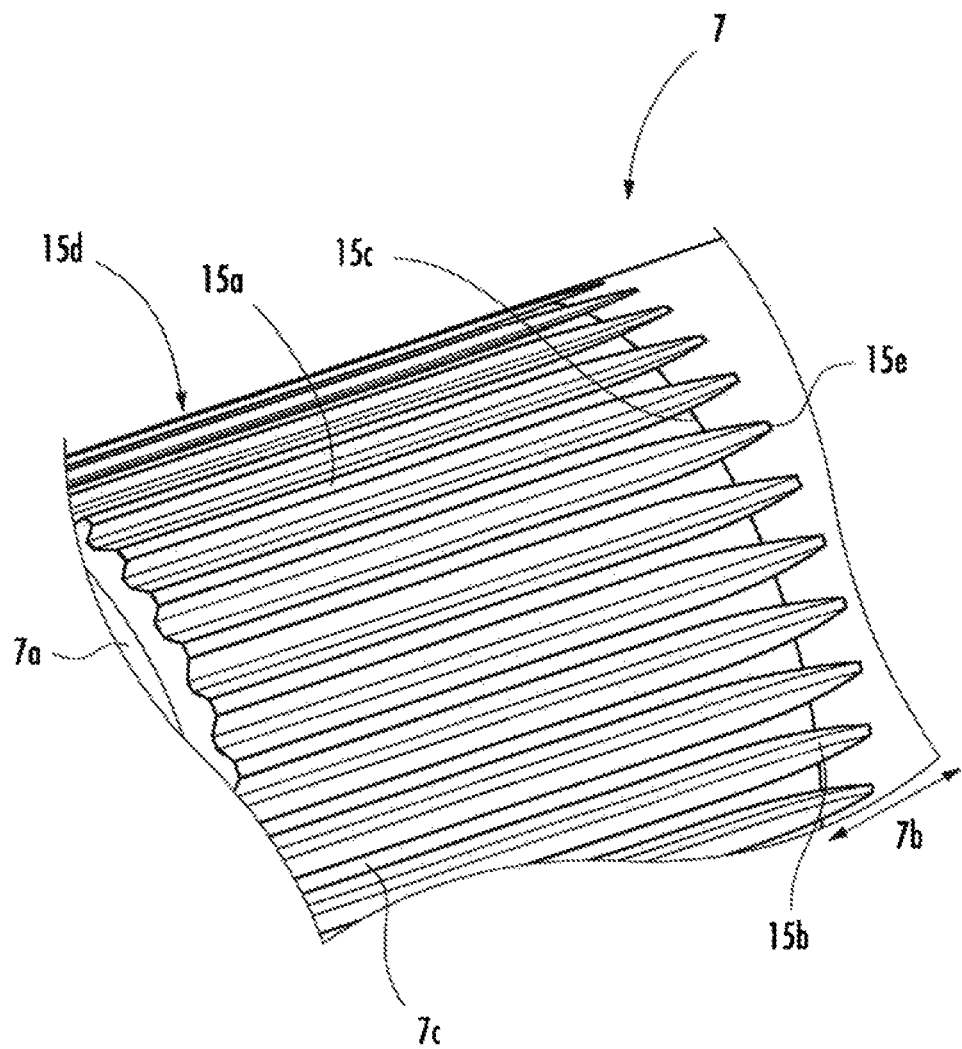
FIG. 4 is a perspective view illustrating engaging grooves of the first rotating body of the present embodiment.

As partially enlarged in FIG. 3, and as illustrated by a perspective view of FIG. 4, an end portion (on the sliding portion side end portion with respect to the differential case 9) outside (on the sliding portion side with respect to the differential case 9) the deepest portion (bottom portion) of the engaging groove 15 draws a gentle arc while curving smoothly and gradually becoming shallow to form a curved end portion 15b continuing to an outer peripheral surface of the drive shaft 7.

In addition, the mountain portion 15a formed between the engaging grooves 15 includes a region having the curved end portion 15b formed therein and the stepped portion 15c formed in a position overlapping the drive shaft 7 in the direction of the rotational axis L1 such that the inner portion of the mountain portion 15a is smaller in diameter than the outer portion thereof. In the present embodiment, a portion of a small diameter inside (on the side gear side of) the stepped portion 15c corresponds to the small diameter portion 15d. Reference numeral 15e in FIGS. 3 and 4 denotes the other end of the engaging grooves 15.

Figure 5:
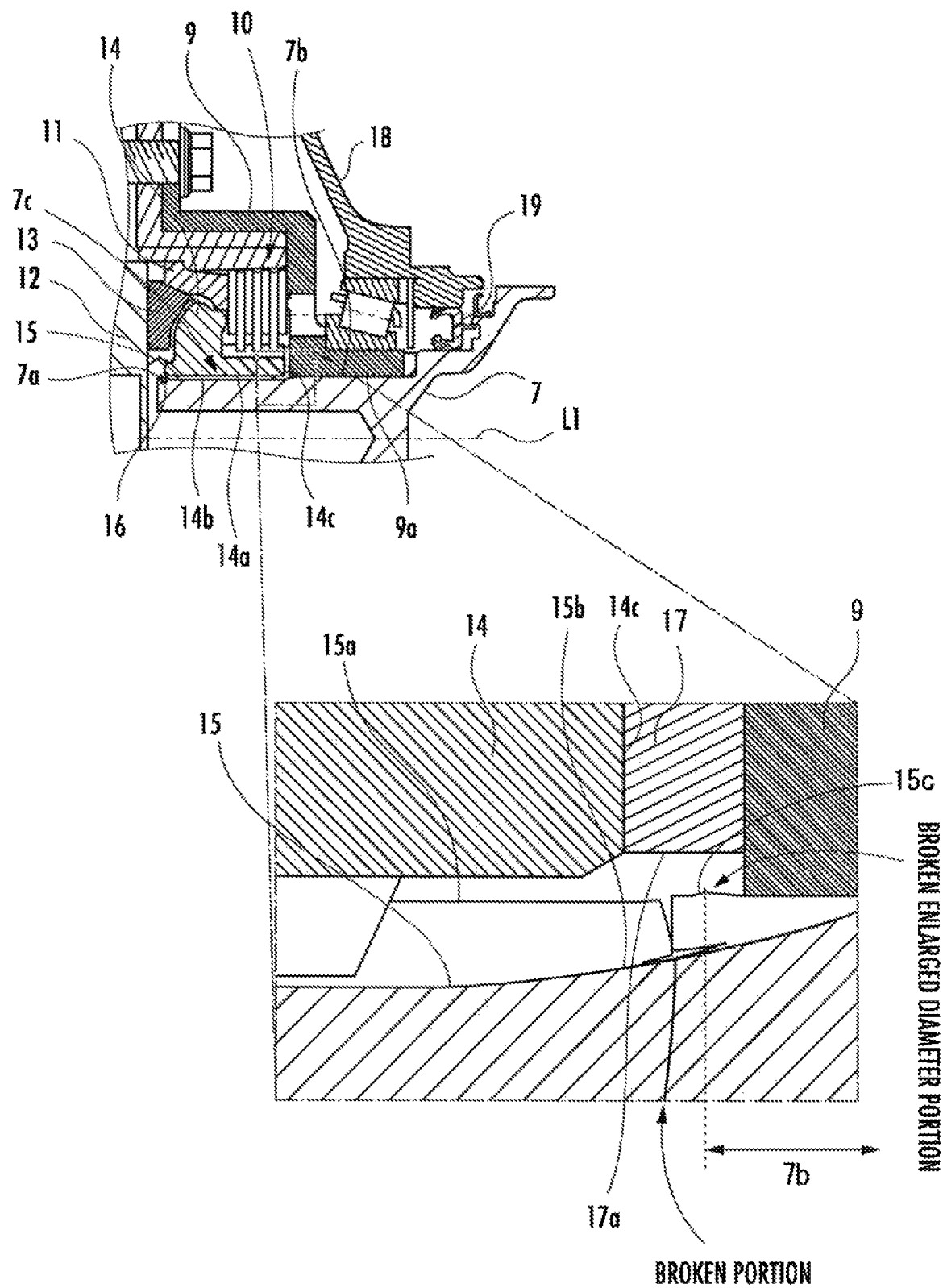
FIG. 5 is a sectional view illustrating a state where the first rotating body of the present embodiment is broken.

As illustrated in FIG. 5, an annular groove 7a is formed in an inner end portion (an end portion on the side gear side) of the drive shaft 7. A set ring 16 is disposed in the annular groove 7a. Internal teeth 14b engaging with the engaging grooves 15 are formed on an inner peripheral surface of the through-hole 14a of the side gear 14.

When the set ring 16 is disposed in the annular groove 7a and the drive shaft 7 is inserted into the through-hole 14a, the set ring 16 exceeds the internal teeth 14b. Then, the set ring 16 expands in diameter by the restoring force, causing the set ring 16 to be locked to the inner end of the internal teeth 14b in the axial direction thereof. As a result, the drive shaft 7 is prevented from slipping out of the side gear 14.

A portion outside (on the differential case side), being spaced at a predetermined interval from the stepped portion 15c of the drive shaft 7 is rotatably abutted and held by the cylindrical portion 9a of the differential case 9 to be slidable. In the drive shaft 7, a portion held by the cylindrical portion 9a corresponds to the sliding portion 7b of the present embodiment (see the area indicated by arrows 7b in FIGS. 4 and 5). Further, in the drive shaft 7, a portion having the engaging grooves 15 formed therein corresponds to the engaging portion 7c of the present embodiment.

In addition, a washer 17 for maintaining a constant distance between the differential case 9 and the side gear 14 is disposed between the differential case 9 and the side gear 14. An insertion hole 17a for inserting the drive shaft 7 is disposed in the washer 17.

The inner diameter of the insertion hole 17a is formed larger than the outer diameter of the drive shaft 7 (the outer diameter of the sliding portion 7b) by a predetermined amount. This predetermined amount is preferably set corresponding to the maximum expanded diameter amount statistically obtained at the time of breakage by experimentally breaking the drive shaft 7.

The washer 17 includes a projected portion (unillustrated) projecting toward the differential case 9 in the direction of the rotational axis L1. This projected portion is engaged with a depressed portion (unillustrated) recessed on a surface facing the washer 17 of the differential case 9. This configuration allows the washer 17 to be engaged with the differential case 9 and prevents the washer 17 from moving in the radial direction. Locking the washer 17 to the differential case 9 in this manner can uniformly secure enough space for the broken portion to expand in diameter at the time of breakage of the drive shaft 7 outward in the circumferential direction of the broken portion.

Alternatively, the differential case 9 may include a projected portion projecting toward the washer 17 and the washer 17 may include a depressed portion engaged with the projected portion of the differential case 9. Still alternatively, the washer 17 may be fixed to the side gear 14. In this case, a depressed projected portion for mutual engagement may be disposed between the side gear 14 and the washer 17. Further, the method of fixing the washer 17 is not limited to the engagement fixing like the present embodiment, but the washer 17 may be fixed with bolts, screws, or the like.

As illustrated in FIG. 5, forming the small diameter portion 15d allows a portion inside (on the side gear side of) the stepped portion 15c to serve as the fragile portion which is broken in the direction of the rotational axis L1. In other words, the break occurs at a portion closer to the rear wheel 4 side (outside in the direction of the rotational axis L1) than a spline-engaged portion between the side gear 14 and the drive shaft 7. At this time, as illustrated in FIG. 6, a portion of the mountain portion 15a in a portion outside (on the differential case side of) the drive shaft 7 broken in the direction of the rotational axis L1 is broken radially outwardly so as to rolled up from the base of the mountain portion 15a, and expands in diameter more than the inner diameter of the cylindrical portion 9a. Therefore, the enlarged diameter portion is caught on the inner end (side gear side end) of the cylindrical portion 9a and prevents the broken portion from slipping out.

Note that a predetermined distance from the stepped portion 15c to the differential case 9 in the direction of the rotational axis L1 in a state where the drive shaft 7 and the differential case 9 are assembled as illustrated in FIG. 5 is set to maintain such a distance that when the drive shaft 7 is broken at a portion inside the stepped portion 15c in the direction of the rotational axis L1, the broken cross sections of the drive shaft 7 are not caught on each other, and a portion outside (on the differential case side of) the broken drive shaft 7 is rotatable without being affected by a portion inside (on the side gear side of) the drive shaft 7.

Here, if a portion outside (on the differential case side of) the broken drive shaft 7 moves excessively in the direction of the rotational axis L1, a seal member 19 between a housing 18 of the power transmission device 1 and the drive shaft 7 may be disengaged, causing lubricating oil to leak.

According to the power transmission device 1 of the present embodiment, assuming that the small diameter portion 15d axially inside (on the side gear side of) the stepped portion 15c is defined as the fragile portion and the broken position is defined, the mountain portion 15a which is rolled up due to breakage in the small diameter portion 15d as the fragile portion is locked to the inner surface of the differential case 9, and thus the drive shaft 7 can be prevented from moving excessively in the rotation axial direction. Therefore, even if the drive shaft 7 is broken near the stepped portion 15c of the small diameter portion 15d, lubricating oil can be prevented from leaking from between the housing 18 and the drive shaft 7.

Then, the method of producing the drive shaft 7 will be described. More specifically, the drive shaft 7 is an output flange constituting a part of the drive shaft 7. First, as a first step, a flange portion 7d (see FIG. 3) and a shaft main body portion 7e (see FIG. 3) whose one end is connected to the flange portion 7d are molded by die forging.

Then, as a second step, the small diameter portion 15d is formed at the other end of the shaft main body portion 7e by cutting and rough processing. The stepped portion 15c is formed by this cutting processing.

Then, as the hollowing step, the shaft main body portion 7e of the drive shaft 7 as the output flange is hollowed from the other end side in the direction of the rotational axis L1 to reduce the weight thereof. Performing the hollowing process before forming the engaging grooves 15 allows hollowing before the strength declines and can improve the degree of processing freedom of the hollowing process. In addition, since the hollowing process is performed before the engaging grooves 15 are formed, the drive shaft 7 can be easily fixed with a jig or the like, thus facilitating the hollowing process.

Then, as the heat treatment step, a quenching and tempering treatment is performed on the drive shaft 7 as the output flange to improve the strength of the drive shaft 7. Since the heat treatment is performed before the engaging grooves 15 are formed, the drive shaft 7 can be easily fixed with a jig or the like, thus facilitating the heat treatment.

Then, as the third step, one end portion of the shaft main body portion 7e is cut to form the engaging grooves 15. The engaging grooves 15 are formed extending from the one end 7f of the shaft main body portion 7e, passing through the small diameter portion 15d, exceeding the stepped portion 15c, and reaching a portion separated by a predetermined distance from the small diameter portion 15d. This predetermined distance is set such that the stepped portion 15c overlaps the curved end portion 15b of the engaging groove 15 in the direction of the rotational axis L1.

In addition, the engaging portion 7c corresponds to the portion in which the engaging grooves 15 of the shaft main body portion 7e are formed. The sliding portion 7b corresponds to the portion from the stepped portion 15c of the shaft main body portion 7e to the other side.

In addition, the engaging grooves 15 and the small diameter portion 15d are formed such that the deepest portion of the engaging grooves 15 (the portion located on the radially innermost side, the bottom of the grooves) is located closer to a radially inner side than the deepest portion of the small diameter portion 15d (the portion located on the radially innermost side).

Then, as the fourth step, the sliding portion 7b and the engaging portion 7c are polished to reduce frictional resistance of the sliding portion 7b and remove burrs and the like caused by formation of the engaging grooves 15 of the engaging portion 7c. Note that in the fourth step, of the engaging portion 7c, a portion (a small diameter portion closer to the other end side than the stepped portion 15c) overlapping the small diameter portion 15d in the direction of the rotational axis L1 is not polished because the portion is smaller in diameter than the sliding portion 7b.

Here, when the rotating body such as the drive shaft and the output shaft is broken in the differential case in the conventional power transmission device, a portion outside the rotating body moves from the broken portion to axially outside and the seal member between the rotating body and the housing of the power transmission device does not work, which may cause oil to leak from inside the power transmission device.

Meanwhile, in the conventional power transmission device, in order to prevent oil leak due to breakage of the rotating body, it is considered to provide the first rotating body with a movement prevention device for preventing the first rotating body from moving axially by a predetermined value or more, but providing the movement prevention device may increase the size of the power transmission device and the production cost.

According to the power transmission device 1 of the present embodiment, the small diameter portion 15d is provided in the engaging portion 7c so as to be located corresponding to between the drive shaft 7 and the differential case 9 in the direction of the rotational axis L1, and the stepped portion 15c is formed between the small diameter portion 15d and the sliding portion 7b. Therefore, the small diameter portion 15d of the engaging portion 7c functions as the fragile portion. When a large twisting load is applied to the drive shaft 7 and the drive shaft 7 is broken, the break occurs at the small diameter portion 15d of the engaging portion 7c.

At this time, as the small diameter portion 15d is twisted and broken, the mountain portion 15a is torn off from the base and rolled up as illustrated in FIG. 6, causing the broken portion to expand in diameter radially outwardly. The expansion in diameter of the mountain portion 15a at the time of the breakage causes the enlarged diameter portion to be caught on the differential case 9 in a space formed between the side gear 14 and the differential case 9. The catching on the differential case 9 can prevent a situation such that the drive shaft 7 excessively moves in the rotation axial direction and the oil leakage prevention function by the seal member 19 between the housing 18 and the drive shaft 7 of the power transmission device 1 does not work and oil may leak from the housing 18.

In addition, according to the power transmission device 1 of the present embodiment, the differential case 9 locks the enlarged diameter portion due to the breakage using the radially outward expansion in diameter due to the breakage of the small diameter portion 15d of the drive shaft 7 without separately providing the movement prevention device for preventing the drive shaft 7 from moving in the rotation axial direction, thus achieving reduction in size of the power transmission device 1.

In addition, according to the power transmission device 1 of the present embodiment, the set ring 16 is provided between the drive shaft 7 and the side gear 14 to regulate relative movement between the drive shaft 7 and the side gear 14 in the direction of the rotational axis L1.

Then, the sliding portion side end portion of the small diameter portion 15d of the drive shaft 7 with respect to the differential case 9 is located closer to the differential case side than the outer end portion 14c (see the enlarged view in FIG. 5) facing the differential case 9 of the side gear 14 in the direction of the rotational axis L1 in a state of being regulated by the set ring 16.

The differential case side end portion is constituted of the set ring 16 and the small diameter portion 15d of the drive shaft 7 as described above. When the drive shaft 7 is broken at a portion adjacent to the stepped portion 15c of the small diameter portion 15d, the side gear 14 can be prevented from suppressing the radial expansion of the broken portion. Thus, the broken portion of the drive shaft 7 is allowed to greatly expand radially outward, and thus the broken portion can be firmly locked to the differential case 9.

Further, according to the power transmission device 1 of the present embodiment, a washer 17 is provided between the side gear 14 and the differential case 9 in the direction of the rotational axis L1 to secure a distance between the side gear 14 and the differential case 9 in the direction of the rotational axis L1, wherein the washer 17 includes the insertion hole 17a for inserting the drive shaft 7.

Providing the washer 17 between the differential case 9 and the side gear 14 in this manner can prevent the washer 17 from narrowing the distance between the side gear 14 and the differential case 9 in the direction of the rotational axis L1 and can maintain the distance between the side gear 14 and the differential case 9 in the direction of the rotational axis L1 so that the broken portion has a distance enough to expand radially outwardly when the drive shaft 7 is broken.

Further, according to the power transmission device 1 of the present embodiment, the inner diameter of the insertion hole 17a of the washer 17 is formed larger by a predetermined amount than the outer diameter of the drive shaft 7. Thus, the broken portion of the drive shaft 7 can be expanded radially further easily. The predetermined amount is set by experimentally obtaining the maximum enlarged diameter amount in advance at the time of breakage of the drive shaft 7.

Note that unlike the side gear 14, the washer 17 does not need to include internal teeth engaged with the engaging grooves 15 of the drive shaft 7. Therefore, even if the inner diameter of the insertion hole 17a is set to be the same as the inner diameter of the side gear 14, the radial space can be increased by the space occupied by internal teeth. If this space can correspond to the maximum enlarged diameter amount at the time of breakage of the drive shaft 7, the inner diameter of the insertion hole 17a may be set to be the same as the inner diameter of the side gear 14 (the inner diameter of the through-hole 14a, excluding the internal teeth 14b).

Further, according to the power transmission device 1 of the present embodiment, the inner diameter of the insertion hole 17a is formed larger than the maximum outer diameter of the enlarged diameter portion whose diameter is enlarged due to breakage of the drive shaft 7 after the drive shaft 7 is broken as a predetermined or more twisting torque is inputted to the drive shaft 7.

The radial expansion at the time of breakage of the drive shaft 7 can be experimentally obtained in advance. Thus, forming the inner diameter of the insertion hole 17a of the washer 17 larger than the experimentally obtained maximum outer diameter of the enlarged diameter portion whose diameter is enlarged due to breakage of the drive shaft 7 can prevent the radial expansion from being suppressed by the washer 17 when the drive shaft 7 is broken and thus the broken portion can be firmly locked to the differential case 9 by a portion expanded radially outwardly by the breakage of the small diameter portion 15d of the drive shaft 7.

Further, according to the power transmission device 1 of the present embodiment, the small diameter portion 15d is formed such that the deepest portion thereof is located radially outwardly of the bottom position of the engaging groove 15. Such a configuration can prevent the drive shaft 7 from being broken only in the direction of the rotational axis L1. Thus, a portion torn off from the base of the mountain portion 15a so as to be rolled up can expand in diameter sufficiently radially outwardly of the outer diameter of the sliding portion 7b.

Note that hereinbefore, the present embodiment has been described using the power transmission device 1 having the multi-plate clutch 10, but the power transmission device 1 of the present invention may be applied to a device not having the multi-plate clutch 10. In this case, the pressure ring 11 is not required, and the pinion shaft 12 may be connected to the differential case 9.

Note also that the engaging groove 15 of the drive shaft 7 has been described to be formed by cutting, but the method of forming the engaging groove 15 of the first rotating body according to the present invention is not limited to this.

Note also that the fragile portion of the present embodiment has been described using the small diameter portion 15d extending from the stepped portion 15c to the inner end in the direction of the rotational axis L1, but the fragile portion of the present invention is not limited to the shape of the small diameter portion 15d of the present embodiment. For example, only a short range of the mountain portion 15a in the direction of the rotational axis L1 is cut along the entire circumference to form an annular groove, and the annular groove may be used as the small diameter portion of the present invention.

Note also that the prime mover of the present embodiment has been described using the internal combustion engine, but the prime mover of the present invention is not limited to this. For example, a regenerative electric motor may be provided in addition to the internal combustion engine or only the regenerative electric motor may be used as the prime mover.

Note also that the present embodiment has been described using a midship type vehicle 2, but the vehicle of the present invention is not limited to the midship type vehicle, but the power transmission device of the present invention may be used for a front engine/front drive type vehicle, a front engine/rear drive type vehicle, and a four wheel drive vehicle.

REFERENCE SIGNS LIST 1 power transmission device
2 vehicle
3 front wheel
4 rear wheel
5 internal combustion engine
6 transmission
7 drive shaft
7a annular groove
7b sliding portion
7c engaging portion
7d flange portion
7e shaft main body portion
7f one end
8 ring gear
8a hypoid pinion
9 differential case
9a cylindrical portion
10 multi-plate clutch
11 pressure ring
12 pinion shaft
13 pinion
14 side gear
14a through-hole
14b internal teeth
14c outer end portion
15 engaging groove
15a mountain portion
15b curved end portion
15c stepped portion
15d small diameter portion
15e the other end
16 set ring
17 washer
17a insertion hole
18 housing
19 seal member
L1 rotational axis

The invention claimed is:
1. A power transmission device comprising:
a rotating body disposed on a power transmission path between a prime mover and a wheel, the rotating body comprising an engaging portion located on one side of the rotating body in a rotation axial direction thereof and having an engaging groove engraved on an outer periphery thereof; and a sliding portion located on the other side of the rotating body in the rotation axial direction and configured to be slidably abutted by an abutment member which can rotate relative to the rotating body, and
an other rotating body engaged with the engaging grooves and integrally rotatable with the rotating body,
an interposed member disposed between the other rotating body and the abutment member in the rotation axial direction to secure a distance between the other rotating body and the abutment member in the rotation axial direction,
wherein the interposed member includes an insertion hole for inserting the rotating body,
wherein the rotating body is arranged such that the sliding portion is located closer to a wheel side on the power transmission path than the engaging portion,
wherein the engaging groove comprises a plurality of engaging grooves extending in the rotation axial direction and formed circumferentially at intervals,
wherein the engaging portion includes a small diameter portion located closer to the one side in the rotation axial direction than the other side which is an end portion on the other side of the engaging groove, and wherein the small diameter portion has an outer diameter smaller than an outer diameter of the sliding portion.

2. The power transmission device according to claim 1, wherein the small diameter portion is formed such that a mountain portion thereof is formed between each of the engaging grooves, the mountain portion being located radially outwardly of a bottom position of the engaging grooves.

3. The power transmission device according to claim 1, wherein the rotating body is defined as a first rotating body and the other rotating body is defined as a second rotating body, wherein the power transmission device further comprises a regulating member which is disposed between the first rotating body and the second rotating body and regulates relative movement between the first rotating body and the second rotating body in the rotation axial direction, and wherein, in a state where the first rotating body and the second rotating body are regulated by the regulating member, an end portion on the other side of the small diameter portion of the first rotating body is located closer to the other side than an end portion on the other side of the second rotating body.

4. The power transmission device according to claim 1, wherein
the insertion hole of the interposed member is formed to have an inner diameter larger by a predetermined amount than an outer diameter of the first rotating body.

5. The power transmission device according to claim 4, wherein
the inner diameter of the insertion hole is formed larger than a maximum outer diameter of an enlarged diameter portion whose diameter is enlarged due to breakage of the first rotating body after the first rotating body is broken as a predetermined or more twisting torque is inputted to the first rotating body.

6. The power transmission device according to claim 4, wherein
the interposed member is radially unmovably fixed to the second rotating body or the abutment member.

7. The power transmission device using the rotating body according to claim 1, wherein
the engaging grooves are formed up to one end which is an end portion on the one side of the rotating body.

8. A vehicle comprising the rotating body or the power transmission device; the prime mover; and the wheel according to claim 1.

* * * * *